US012559650B2

(12) United States Patent
Takashima et al.

(10) Patent No.: US 12,559,650 B2
(45) Date of Patent: Feb. 24, 2026

(54) ADHESIVE ARTICLE

(71) Applicant: NITTO DENKO CORPORATION, Ibaraki (JP)

(72) Inventors: Atsushi Takashima, Ibaraki (JP); Ginji Mizuhara, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 548 days.

(21) Appl. No.: 17/282,476

(22) PCT Filed: Oct. 3, 2019

(86) PCT No.: PCT/JP2019/039199
§ 371 (c)(1),
(2) Date: Apr. 2, 2021

(87) PCT Pub. No.: WO2020/071508
PCT Pub. Date: Apr. 9, 2020

(65) Prior Publication Data
US 2021/0380846 A1 Dec. 9, 2021

(30) Foreign Application Priority Data

Oct. 5, 2018 (JP) ................................. 2018-190115
Sep. 30, 2019 (JP) ................................. 2019-179321

(51) Int. Cl.
C09J 7/21 (2018.01)
C09J 133/08 (2006.01)
(Continued)

(52) U.S. Cl.
CPC .............. C09J 7/21 (2018.01); C09J 133/08 (2013.01); D06M 15/263 (2013.01);
(Continued)

(58) Field of Classification Search
CPC ........ C09J 7/21; C09J 133/08; C09J 2433/00; C09J 2467/006; C09J 7/10;
(Continued)

(56) References Cited

U.S. PATENT DOCUMENTS 3,390,036 A * 6/1968 Wright ..................... D02G 3/46
2/243.1
3,622,438 A * 11/1971 Esler ................... D06M 15/227
428/375
(Continued)

FOREIGN PATENT DOCUMENTS

EP 3 689 991 A1 8/2020
JP S54-161650 A 12/1979
(Continued)

OTHER PUBLICATIONS

International Search Report issued for corresponding International Patent Application No. PCT/JP2019/039199 on Dec. 24, 2019, along with an English translation.
(Continued)

*Primary Examiner* — Elizabeth M Imani
(74) *Attorney, Agent, or Firm* — HAUPTMAN HAM, LLP

(57) ABSTRACT
The present invention relates to an adhesive article including a core material and an adhesive layer covering a longitudinal surface of the core material, in which the core material is a multifilament yarn including four or more filaments.

3 Claims, 3 Drawing Sheets

(51) Int. Cl.
  *D06M 15/263* (2006.01)
  *D06M 101/32* (2006.01)
(52) U.S. Cl.
  CPC ...... *C09J 2433/00* (2013.01); *C09J 2467/006*
    (2013.01); *D06M 2101/32* (2013.01)
(58) Field of Classification Search
  CPC .. C09J 2203/326; C09J 2301/202; C09J 5/00;
    C09J 201/00; C09J 2203/358; C09J
    2301/312; D06M 15/263; D06M 2101/32;
    D02G 3/40
  USPC .......................................................... 428/376
  See application file for complete search history.

(56) References Cited

U.S. PATENT DOCUMENTS

| | | | | | |
|---|---|---|---|---|---|
| 4,405,746 | A | * | 9/1983 | Girgis | C08J 5/08 |
| | | | | | 524/487 |
| 4,584,227 | A | | 4/1986 | Darjee et al. | |
| 4,655,734 | A | * | 4/1987 | Okawa | F16G 5/166 |
| | | | | | 474/267 |
| 4,861,820 | A | * | 8/1989 | Toyoda | C08J 5/06 |
| | | | | | 524/510 |
| 5,346,731 | A | * | 9/1994 | Nakanishi | D02G 3/48 |
| | | | | | 87/8 |
| 9,593,445 | B2 | * | 3/2017 | Akiyama | C08J 5/06 |
| 2013/0217528 | A1 | * | 8/2013 | Matsumoto | F16G 1/10 |
| | | | | | 427/407.1 |
| 2020/0263065 | A1 | | 8/2020 | Takashima et al. | |
| 2021/0009864 | A1 | | 1/2021 | Takashima et al. | |
| 2021/0380846 | A1 | | 12/2021 | Takashima et al. | |
| 2021/0388237 | A1 | | 12/2021 | Takashima et al. | |

FOREIGN PATENT DOCUMENTS

| | | | |
|---|---|---|---|
| JP | S61-159380 | A | 7/1986 |
| JP | H1-308471 | A | 12/1989 |
| JP | H3-231980 | A | 10/1991 |
| JP | H4-76080 | A | 3/1992 |
| JP | 2001-161238 | A | 6/2001 |
| JP | 2006-182838 | A | 7/2006 |
| JP | 2006-274492 | A | 10/2006 |
| JP | 2015-209446 | A | 11/2015 |
| JP | 2018-44139 | A | 3/2018 |
| KR | 1984-0001189 | Y1 | 7/1984 |
| KR | 10-2016-0073668 | A | 6/2016 |
| TW | 1822874 | B | 11/2023 |
| WO | 2019/065886 | A1 | 4/2019 |
| WO | 2019/163788 | A1 | 8/2019 |

OTHER PUBLICATIONS

Written Opinion issued for corresponding International Patent Application No. PCT/JP2019/039199 on Dec. 24, 2019.

Extended European Search Report issued on Jun. 20, 2022 for corresponding European Patent Application No. 19869377.2.

Office Action issued on Sep. 28, 2022 for corresponding Chinese Patent Application No. 201980065554.0, along with an English translation (12 pages).

Information Offer Form issued on Oct. 28, 2022 for corresponding Japanese Patent Application No. 2019-179321, along with an English machine translation (13 pages).

Office Action issued on Oct. 24, 2023 for corresponding Japanese Patent Application No. 2019-179324, along with an English machine translation (7 pages).

Office Action issued on Oct. 24, 2023 for corresponding Japanese Patent Application No. 2019-179321, along with an English machine translation (7 pages).

Decision of Refusal issued on Jan. 16, 2024 for corresponding Japanese Patent Application No. 2019-179324, along with an English machine translation (4 pages).

Office Action issued on Mar. 6, 2023 for corresponding Taiwanese Patent Application No. 108136098, along with an English translation (9 pages).

Office Action issued on Apr. 19, 2025 for corresponding Chinese Patent Application No. 202310839870.7, along with an English machine translation (15 pages).

Office Action issued on Mar. 15, 2024 for corresponding Taiwanese Patent Application No. 112139713, along with an English translation (10 pages).

Decision of Refusal issued on Mar. 12, 2024 for corresponding Japanese Patent Application No. 2019-179321, along with an English machine translation (5 pages).

Office Action issued on Mar. 18, 2024 for corresponding Korean Patent Application No. 10-2021-7009951, along with an English translation (8 pages).

Office Action issued on Jan. 22, 2025 for corresponding Korean Patent Application No. 10-2021-7009951, along with an English machine translation (11 pages).

Office Action issued on Sep. 29, 2025 for corresponding Korean Patent Application No. 10-2021-7009951, along with an English machine translation (6 pages).

Office Action issued on Nov. 8, 2025 for corresponding Chinese Patent Application No. 202310839870.7, along with an English machine translation (12 pages).

Zhang, "Textile Materials", China Textile Press, 1st Edition, Dec. 31, 2005, pp. 351-352, along with an English machine translation, (9 pages).

* cited by examiner (a)

(b)

(c)

(a)

(b)

ADHESIVE ARTICLE

CROSS REFERENCE TO RELATED APPLICATION

This application is a National Stage of International Application No. PCT/JP2019/039199, filed on Oct. 3, 2019, which designates the United States and was published in Japan, and which is based upon and claims priority to Japanese Patent Application Nos. 1) 2018-190115, filed on Oct. 5, 2018; and 2) 2019-179321, filed on Sep. 30, 2019 in the Japan Patent Office. All of the aforementioned applications are hereby incorporated by reference in their entireties.

TECHNICAL FIELD

The present invention relates to an adhesive article.

BACKGROUND ART

Conventionally, an adhesive article having a yarn-like core material is known. For example, Patent Literature 1 discloses a yarn-like adhesive article in which an adhesive is adhered to a yarn-like core material.

CITATION LIST

Patent Literature

Patent Literature 1: JP H03-231980 A

SUMMARY OF INVENTION

Technical Problem

A yarn-like shape of such an adhesive article provides an advantage that the adhesive article can be easily applied to a complicated shape such as a curved line, a curved surface, and an uneven surface, and can be also applied to a narrow part. Unlike liquid adhesives, such an adhesive article has no risk of dripping, squeezing out, or the like.

Such a yarn-like adhesive article usually has a low adhesive force as compared with a double-sided pressure-sensitive adhesive tape due to a small area of contact with an adherend, and thus was often used in applications where high adhesive force is not required, such as temporary fixing or adhesion of a relatively light component. Patent Literature 1 also discloses that a yarn-like adhesive is used for adhesion of a relatively light poster, temporary fixing of parts and materials, adhesion of an office appliance, and the like.

Therefore, studies to improve the adhesive force of a conventional yarn-like adhesive article have not been sufficiently examined In view of the above, an object of the present invention is to provide a yarn-like adhesive article having excellent adhesive force.

Solution to Problem

As a result of inventive studies, the present inventors found that using a core material which is easily deformed in the thickness direction for an adhesive article having a yarn-like core material can solve the above problem, and thus the present inventors have completed the present invention.

That is, the adhesive article of the present invention is an adhesive article, comprising a core material and an adhesive layer covering a longitudinal surface of the core material, wherein the core material is a multifilament yarn including four or more filaments.

In one embodiment of the adhesive article of the present invention, the core material may have a twist coefficient K represented by a formula (A) described in the present description of 0 to 200.

In one embodiment of the adhesive article of the present invention, the core material may have a twist number of 0 to 250 times/m.

In one embodiment of the adhesive article of the present invention, the filament may be a hollow yarn.

In one embodiment of the adhesive article of the present invention, the filament may be a chemical fiber.

Advantageous Effects of Invention

The adhesive article of the present invention is yarn-like and excellent in adhesive force. Accordingly, the adhesive article of the present invention can be used in a wide range of applications.

Figure 2:
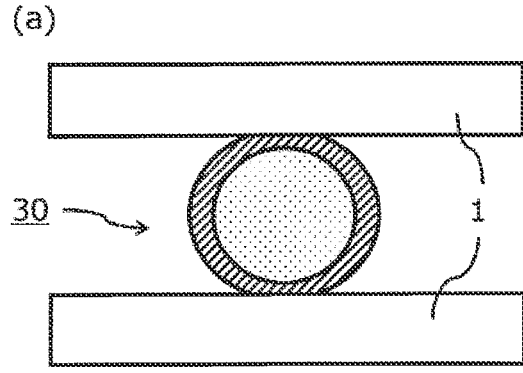
Figure 2:
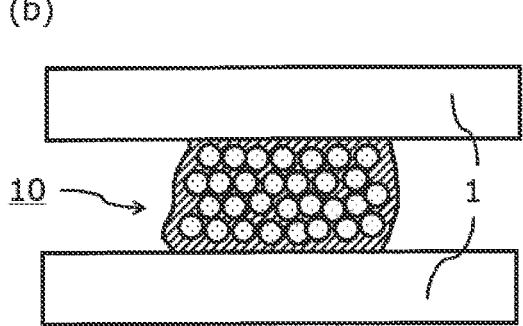
Figure 2:
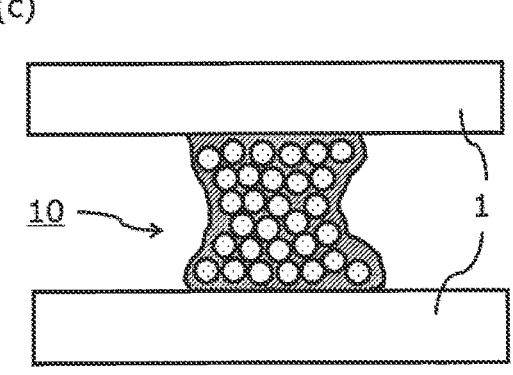

(a) of FIG. 2 is a schematic view illustrating a state in which adherends are allowed to bond to each other with an adhesive article including a core material made of a single yarn (monofilament), and (b) and (c) of FIG. 2 are schematic views illustrating a state in which the adherends are allowed to bond to each other with the adhesive article according to the first embodiment of the present invention.

Figure 3:
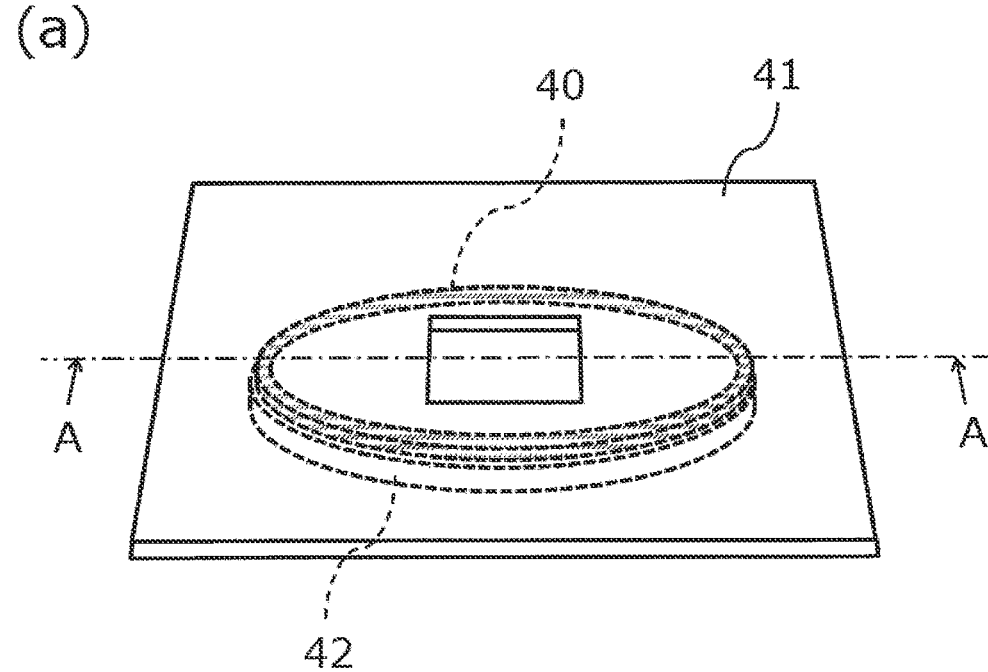
Figure 3:
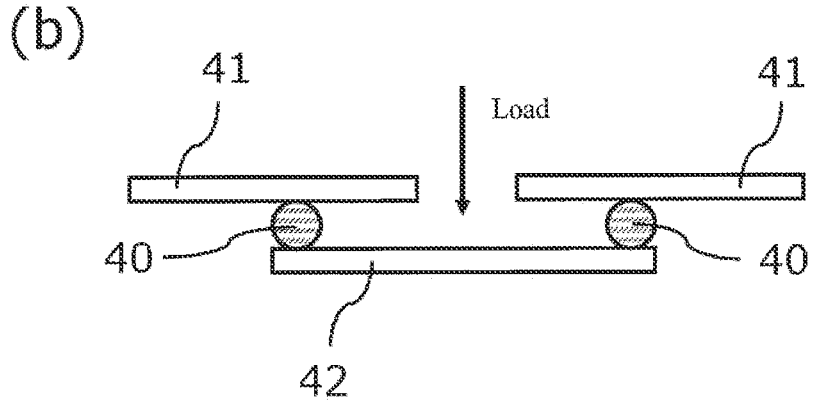

(a) of FIG. 3 is a perspective view for explaining a method of evaluating the adhesive force of the adhesive article of the present invention, and (b) of FIG. 3 is a cross-sectional view taken along line A-A of (a) of FIG. 3.

DESCRIPTION OF EMBODIMENTS

Hereinafter, embodiments of the present invention will be described in detail. The present invention is not limited to the embodiments to be described below. In the following drawings, members/parts that perform the same action may be described with the same reference numerals, and duplicate description may be omitted or simplified. The embodiments illustrated in the drawings are schematically described for the purpose of clearly explaining the present invention, and do not necessarily accurately represent the size or scale of an actual product.

Figure 1:
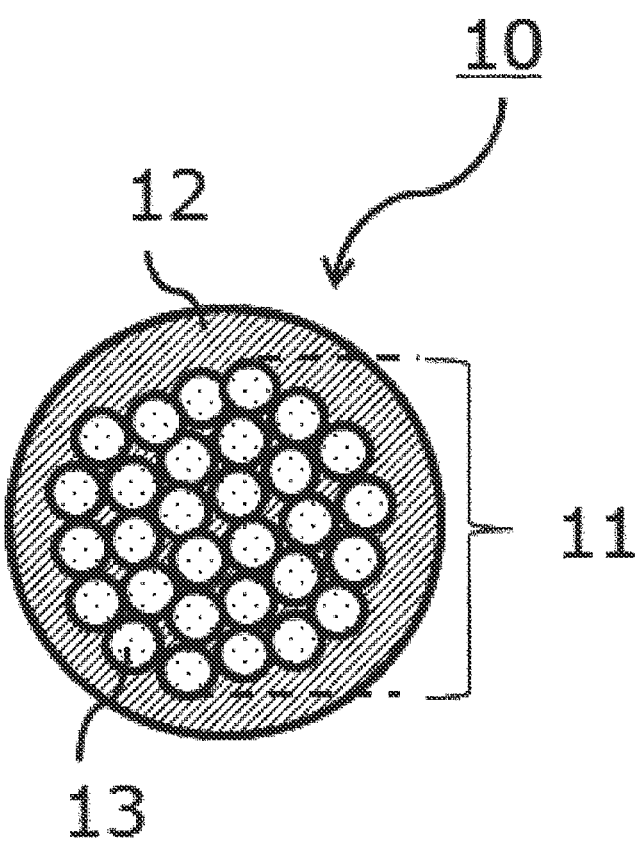
FIG. 1 is a cross-sectional view of an adhesive article according to a first embodiment of the present invention in the cross section perpendicular to a longitudinal direction.

FIG. 1 is a cross-sectional view of an adhesive article 10 according to an embodiment of the present invention in the cross section perpendicular to a longitudinal direction. The adhesive article 10 according to the present embodiment includes a core material 11 and an adhesive layer 12 covering the longitudinal surface of the core material 11, and the core material 11 is a multifilament yarn including four or more filaments 13.

The adhesive article of the present embodiment has such a configuration, and thus has excellent adhesive force. This will be described in detail below.

The adhesive force in the case of allowing adherends to bond to each other by the adhesive article (difficulty in debonding the adherends) is greatly affected by the contact area between the adhesive article and the adherends. (a) of FIG. 2 is a schematic view illustrating a state in which the adherends 1 are allowed to bond to each other with an adhesive article 30 including a core material made of a single yarn (monofilament). The core material of such an adhesive article is less likely to deform, and thus, such an adhesive article has the small contact area with the adherend and it is difficult for such an adhesive article to exhibit a high adhesive force.

However, when the adherends 1 are allowed to bond to each other with the adhesive article 10 of the present embodiment, as shown in (b) of FIG. 2, each of the filaments 13 constituting the core material 11 is spread so as to be loosened, and the core material 11 is deformed so as to crush. As a result, the adhesive article 10 of the present embodiment can come into contact with the adherends in a wider area as compared with an adhesive article including a core material made of a single yarn (monofilament).

The core material 11 in the present embodiment includes four or more filaments 13, and thus the surface area of the core material 11 is large. Accordingly, an adhesion amount of the adhesive per unit length can be increased.

For the reasons described above, the adhesive article 10 of the present embodiment exhibits a higher adhesive force as compared with an adhesive article in which a core material is included and made of monofilament and in which the thickness (fineness) of the core material is same as that of the core material of the adhesive article 10.

For obtaining the above effects, the core material 11 in the present embodiment is a multifilament yarn including four or more filaments 13. For further improving the adhesive force, the number of filaments 13 constituting the core material 11 in the present embodiment is preferably 10 or more, more preferably 15 or more, and even more preferably 20 or more. On the other hand, when the thickness (fineness) of the core material 11 is kept at the same level, when the number of filaments 13 constituting the core material 11 increases, each of the filaments become thinner (fineness decreases). If the filaments are too thin, the strength of the core material 11 may be reduced or the handling property may be deteriorated. Thus, the number of filaments constituting the core material 11 is preferably 300 or less.

In addition, the core material 11 in the present embodiment may be a twisted yarn or a non-twisted yarn. That is, the core material 11 in the present embodiment may have a twist number of more than 0 times/m or 0 times/m. In addition, the core material 11 according to the present embodiment may be a bundle in which multifilaments, which may be a twisted yarn or non-twisted yarn, are twisted, or a bundle in which multifilaments, which may be a twisted yarn or non-twisted yarn, are not twisted.

When a force is applied in a direction in which the adherends 1 allowed to bond to each other with the adhesive article 10 of the present embodiment are debonded, each of the filaments 13 spreads as shown in (c) of FIG. 2, and the core material 11 is deformed so as to extend in a direction parallel to the applied force in the thickness direction (direction perpendicular to the longitudinal direction). However, if the shape of the core material 11 is excessively distorted at this time, stress is concentrated in the distorted portion, and the portion is likely to be a starting point of debonding. Thus, the filaments 13 constituting the core material 11 are preferably bundled together to some extent for achieving even more excellent adhesive force. As described above, the core material 11 in the present embodiment may be a non-twisted yarn or a twisted yarn. That is, the twist number of the core material 11 in the present embodiment may be 0 times/m or more. The core material 11 in the present embodiment is preferably twisted for allowing each of the filaments 13 constituting the core material 11 to be bundled together to some extent. Specifically, the twist number of the core material 11 in the present embodiment is preferably 30 times/m or more, more preferably 60 times/m or more, and even more preferably 90 times/m or more.

On the other hand, the twist of the core material 11 is preferably not too tight for allowing the core material 11 to sufficiently deform when the adherends 1 are allowed to bond to each other and for increasing the adhesion amount of the adhesive per unit length. Thus, the twist number of the core material 11 is preferably 3000 times/m or less, more preferably 1500 times/m or less, even more preferably 800 times/m or less, and particularly preferably 250 times/m or less.

When the core material 11 is twisted, it is preferable to control the twist coefficient represented by the following formula (A) from the same viewpoint as described above. The twist coefficient is an index for discussing the influence (influence on the bundling of the core material, ease of deformation, the adhesion amount of the adhesive, and the like) of twist regardless of the thickness of the core material. That is, the influence of the twist number on the core material varies depending on the thickness of the core material, but the same twist coefficient influences on the core material to the same extent regardless of the thickness of the core material.

The twist coefficient of the core material in the present embodiment is preferably 0 or more, and more preferably greater than 0. On the other hand, when the twist coefficient is 200 or less, the flexibility of the core material and the adhesive article is improved to easily apply the adhesive article to a complex shape such as a curved portion, a bent portion and an uneven portion, and to a narrow portion. Thus, the twist coefficient of the core material is preferably 200 or less, more preferably 170 or less, more preferably 100 or less, still more preferably 80 or less, and further more preferably less than 50.

[Formula 1]

$$K = T/\sqrt{10000/D} \tag{A}$$

In the formula (A), K is a twist coefficient, T is a twist number (unit: [times/m]), and D is a fineness (unit: [dtex]).

The material of the filament 13 forming the core material 11 in the present embodiment is not limited, but may be a chemical fiber or a natural fiber. Examples of the chemical fiber include various polymer materials such as rayon, cupra, acetate, promix, nylon, aramid, vinylon, vinylidene, polyvinyl chloride, polyester, acryl, polyethylene, polypropylene, polyurethane, polyclar, and polylactic acid, glasses, carbon fibers, synthetic rubbers such as urethane rubber, metal, and the like. Examples of the natural fiber include silk, natural rubber, and the like.

From the viewpoint of adhesive force, the filament 13 forming the core material 11 in the present embodiment is preferably a chemical fiber. The chemical fiber is less likely to fluff and distort. Thus, when the filament forming the core material in the present embodiment is a chemical fiber, a starting point of debonding is less likely to occur, and the excellent adhesive force is exhibited.

Among the chemical fibers, polyester or nylon is particularly preferable.

In addition, the filament 13 forming the core material 11 in the present embodiment may be a hollow yarn. The hollow yarn is typically rich in flexibility in the thickness direction and is easily deformed, and thus the core material obtained by using the hollow yarn is also rich in flexibility in the thickness direction and is also easily deformed.

Thus, the use of a hollow yarn for the filament forming the core material allows for easily causing the above-mentioned deformation like crush of the core material. When the flexibility of the core material is high, stress is likely to be dispersed due to deformation of the core material when a force is applied in a direction in which the adherends allowed to bond using the adhesive article is debonded, so that stress is less likely to be applied to the interface (adhesive surface) between the adhesive article and the adherend, and debonding is less likely to occur. In view of the above, the use of a hollow yarn for the filament forming the core material allows for achieving an adhesive article having particularly excellent adhesive force.

Since the hollow yarn is usually brittle, the hollow yarn is preferably used without twisting when the hollow yarn is used for the filament forming the core material.

The thickness (fineness) of the core material 11 in the present embodiment is not limited, but may be appropriately adjusted depending on the use of the adhesive article or the type of the adherend. For example, the thickness is about 20 dtex to 2000 dtex.

Various additives such as a filler (an inorganic filler, an organic filler or the like), an anti-aging agent, an antioxidant, an ultraviolet absorber, an antistatic agent, a lubricant, a plasticizer, and a colorant (pigment or dye) may be blended in the core material 11, as necessary. The surface of the core material may be subjected to known or conventional surface treatments such as corona discharge treatment, plasma treatment, and application of an undercoating agent.

The adhesive layer 12 in the present embodiment is formed of an adhesive. The adhesive for forming the adhesive layer 12 is not limited, but conventional adhesives can be used. The adhesive may be an acrylic adhesive, a rubber adhesive, a vinyl alkyl ether adhesive, a silicone adhesive, a polyester adhesive, a polyamide adhesive, a urethane adhesive, a fluorine adhesive and an epoxy adhesive. Above all, a rubber adhesive and an acrylic adhesive are preferred from the standpoint of adhesiveness, and an acrylic adhesive is particularly preferred. The adhesive may be used alone or in combination of two or more thereof. The adhesive in this embodiment is preferably a pressure-sensitive adhesive that has adhesiveness at normal temperatures and can attach an adherend to the surface thereof by a pressure caused on contact between the surface of the adhesive and the surface of the adherend. The pressure-sensitive adhesive does not require heating and therefore can be applied to an adherend that is weak against heat.

The acrylic adhesive contains, as a main ingredient, a polymer of monomers including a (meth)acrylic acid alkyl ester such as ethyl acrylate, butyl acrylate, 2-ethylhexyl acrylate, isooctyl acrylate or isononyl acrylate as a main component, and a modifying monomer such as acrylonitrile, vinyl acetate, styrene, methyl methacrylate, acrylic acid, maleic anhydride, vinylpyrrolidone, glycidyl methacrylate, dimethyl aminoethyl methacrylate, hydroxyethyl acrylate or acrylamide, added to the main ingredient as necessary.

The rubber adhesive contains a rubber polymer such as natural rubber, a styrene-isoprene-styrene block copolymer, a styrene-butadiene-styrene block copolymer, a styrene-ethylene/butylene-styrene block copolymer, a styrene-butadiene rubber, polybutadiene, polyisoprene, polyisobutylene, butyl rubber, chloroprene rubber or silicone rubber, as a main ingredient.

Tackifying resins such as rosin type, terpene type, styrene type, aliphatic petroleum type, aromatic petroleum type, xylene type, phenol type, coumarone indene type and their hydrogenated products, and various additives such as a crosslinking agent, a viscosity regulator (such as a thickener), a leveling agent, a release modifier, a plasticizer, a softener, a filler, a coloring agent (pigment, dye or the like), a surfactant, an antistatic agent, a preservative, an age resister, an ultraviolet absorber, an antioxidant and a light stabilizer can be appropriately added to those adhesives.

As the adhesive, either a solvent-type adhesive or a water-dispersible type adhesive can be used. Here, a water-dispersible adhesive is preferable from the viewpoints that the water-dispersible adhesive can be high-speedily coated, is environmentally friendly, and the solvent has a small influence on the core material 11 (swelling or dissolution).

In order to further improve the adhesive force of the adhesive article 10 of the present embodiment, a large amount of adhesive is preferably adhered to the core material. Specifically, the adhesion amount of the adhesive in the adhesive article of the present embodiment (weight of the adhesive layer per unit length) is preferably 5 mg/m or more, more preferably 8 mg/m or more, and even more preferably 16 mg/m or more. On the other hand, if the adhesion amount of the adhesive is excessive, it is necessary to apply the adhesive a plurality of times to the core material and it takes time to dry the applied adhesive in the production process, so that the production efficiency is low. Thus, the adhesion amount of the adhesive in the adhesive article of the present embodiment is preferably 200 mg/m or less, more preferably 180 mg/m or less, and even more preferably 160 mg/m or less.

In the adhesive article 10 of the present embodiment, the adhesive layer 12 may cover the entire surface (surface in the longitudinal direction) of the core material 11, or may cover only a part of the surface of the core material 11. The adhesive layer 12 is typically formed continuously, but is not limited to such a form. The adhesive layer 12 may be formed in a regular pattern such as a dot or a stripe or in a random pattern. The end surface of the core material may or may not be covered with the adhesive layer 12. For example, when the adhesive article 10 is cut in the production process or when used, the end surface of the core material 11 may not be covered with the adhesive layer 12.

An example of a method of producing the adhesive article 10 of the present embodiment will be described below. The method of producing the adhesive article 10 of the present embodiment is not limited to the method described below.

The adhesive article 10 of the present embodiment can be obtained by coating an adhesive to the surface of the core material 11 by dipping, immersing, applying, or the like, followed by heating and drying. The application of the adhesive can be performed, for example, using a conventional coater such as a gravure roll coater, a reverse roll coater, a kiss roll coater, a dip roll coater, a bar coater, a knife coater, or a spray coater. The drying temperature and time are not limited, but the drying temperature is preferably 40° C. to 200° C., more preferably 50° C. to 180° C., and particularly preferably 70° C. to 120° C. The drying time is preferably from 5 seconds to 20 minutes, more preferably from 5 seconds to 10 minutes, particularly preferably from 10 seconds to 5 minutes.

The adhesive article 10 of the present embodiment can be allowed to adhere to a member having a narrow width or a narrow region while being prevented from protruding, and is also easily applied to a complex shape such as a curved line, a curved surface, and an uneven shape. The adhesive article is preferable in terms of being able to easily disassemble (reworking). Further, the adhesive article has an excellent adhesive force and can be used for adhesion of various articles.

For example, the adhesive article 10 of the present embodiment can be suitably used for fixing an article in the production of an electronic device, and can be applied to, for example, fixing a narrow frame of a mobile terminal such as a mobile phone or a smartphone.

When an adhesive tape is tried to be allowed to adhere to an adherend having a complicatedly shaped portion, for example, such as a curved line, a curved surface and unevenness, a wrinkle or overlap occurs on such a portion and makes it difficult to allow the adhesive tape to adhere beautifully while protrusions are suppressed. Furthermore, the portion at which the wrinkle or overlap occurred may become a factor of decreasing adhesive force. In addition, in order to allow the adhesive tape to adhere such that wrinkle and overlap do not occur, it may be considered to cut the adhesive tape finely and stuck the cut adhesive tape, but this greatly deteriorates workability. On the other hand, the adhesive article 10 of the present invention can be allowed to firmly adhere to the complicatedly shaped portion such as a curved line, a curved surface and unevenness without occurrence of wrinkle and overlap. Furthermore, the adhesive article 10 can be allowed to adhere to the desired portion at one time, that is, by one step, and therefore has excellent workability and can be applied to automated line.

Specifically, the adhesive article 10 of the present embodiment can be suitably used, for example, for fixing cables such as electric wires and optical fibers, optical fiber sensors such as LED fiber light and FBG (Fiber Bragg Gratings), various wire materials (linear members) such as a yarn, a string and a wire and members having a narrow width, in a desired form.

Even in the case of fixing a wire material or a member having a narrow width to another member, in a complicated form, the adhesive article 10 of the present embodiment can firmly fix a wire material or a member having a narrow width to another member according to the complicated shape that a wire materials and a narrow member have, with excellent workability while protrusions, wrinkles and overlaps are suppressed. In the case of fixing a wire material or a member having a narrow width to another member, after the adhesive article 10 of the present embodiment has been first allowed to adhere to the surface of another member according to the form in which a wire material and a member having a narrow width are to be fixed, the wire material or the member having a narrow width can be allowed to adhere and fixed to the adhesive article adhering to the surface of another member. Alternatively, after the adhesive article of the present embodiment is allowed to adhere to the wire material and the member having a narrow width, the wire material or narrow member may be fixed to another member in a desired form.

The adhesive article 10 of the present embodiment can be suitably used for temporary fixing (temporary tacking) of an article, which is for temporarily fixing (temporarily tacking) one article to the surface of another article. More specifically, the adhesive article of the present embodiment can be used for temporary fixing (temporary tacking) when textile products, leather products and the like such as clothes, shoes, bags and hats are produced. However, the uses are not limited to those, and the adhesive article is suitably used in various uses in which temporary fixing (temporary tacking) is desired.

For example, when one article is to be fixed to the surface of another article, one article is previously temporarily fixed to the surface of another article using the yarn-like adhesive article, followed by positioning, and both articles are then fixed (actually fixed) to each other by a fixing method such as thermocompression bonding or sewing. In this case, the adhesive article of the present embodiment allows for easy temporary fixation while avoiding the fixing portion provided between both articles. For example, in the case of sewing textile products or leather products, temporarily fixation with the yarn-like adhesive article allows for easily performing the temporary fixation while avoiding a sewing portion and allows for preventing the adhesive article from adhering to a needle.

As described above, even when both articles have complicated shape such as a curved line, a curved surface or unevenness, the adhesive article of the present embodiment allows for well sticking both articles to each other while protrusions, wrinkles and overlaps are suppressed. Additionally, the adhesive article of the present embodiment allows both articles to stick to each other in one step, and thus workability is good.

For example, even in a deformable member such as a textile, a cloth or a leather that constitutes a textile product or a leather product, temporary fixation with use of the adhesive article of the present embodiment can inhibit or prevent the member from deforming by pulling, and thus design after fixing (actual fixing) is better.

Furthermore, after fixation (actual fixation) of both articles, the adhesive article of the present embodiment can be easily extracted and removed from a space between both articles fixed (actually fixed), as necessary. In such a way, protrusions of an adhesive can be prevented and deterioration of design derived from discoloration with time of a residual adhesive.

The adhesive article 10 of the present embodiment can be twisted with a yarn made of other material to form a composite yarn or can be interwoven with a yarn or cloth (including nonwoven fabric and sheet) made of other material. In such a way, integration of functions can be attempted.

EXAMPLES

Hereinafter, the present invention is specifically described below by reference to examples, but the invention is not limited to those examples.

[Production of Adhesive Articles]

Example 1

(Preparation of Aqueous Dispersion Type Acrylic Adhesive Composition for Adhesive Layer Formation)

40 parts by weight of ion-exchanged water were added to a reaction vessel equipped with a cooling pipe, a nitrogen introduction pipe, a thermometer and a stirrer, and the water was stirred at 60° C. for 1 hour or more while introducing nitrogen gas, thereby performing nitrogen substitution. 0.1 parts by weight of 2,2'-azobis[N-(2-carboxyethyl)-2-methylpropionamidine] n hydrate (polymerization initiator) were added to the reaction vessel. Monomer emulsion A was gradually dropped to the reaction vessel over 4 hours while maintaining the system at 60° C., thereby promoting emulsion polymerization reaction.

The monomer emulsion A used was an emulsion obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), 0.02 parts by weight of γ-methacryloxypropyltrimethoxysilane (manufactured by Shin-Etsu Chemical Co., Ltd., trade name "KBM-503") and 2 parts by weight of polyoxyethylene lauryl sodium sulfate (emulsifier) to 30 parts by weight of ion-exchanged water, followed by emulsifying. After completion of dropwise addition of the monomer emulsion A, the resulting mixture was maintained at 60° C. for 3 hours, and the system was cooled to room temperature. The pH of the mixture was then adjusted to 7 by adding 10% ammonia water. Thus, an acrylic polymer emulsion (aqueous dispersion type acrylic polymer) A was obtained.

20 parts by weight of a tackifying resin emulsion based on a solid content (manufactured by Arakawa Chemical Industries, Ltd., trade name "E-865NT") per 100 parts by weight of the acrylic polymer contained in the acrylic polymer emulsion A were added. Furthermore, the pH was adjusted to 7.2 and viscosity was adjusted to 10 Pa·s with 10 mass % ammonia water as a pH regulator and polyacrylic acid (manufactured by Toagosei Co., Ltd., trade name "ARON B-500") as a thickener. Thus, an aqueous dispersion type acrylic adhesive composition A for adhesive layer was obtained.

(Preparation of Adhesive Articles)

A multifilament yarn (267 dtex) that was obtained by bundling 12 polyester yarns (filaments) without twisting was used as a core material. The aqueous dispersion type acrylic adhesive composition A was coated on the core material by dipping such that the adhesion amount of the adhesive in the obtained adhesive article was 65 mg/m, and followed by drying at 80° C. for 5 minutes, thereby forming an adhesive layer to obtain the adhesive article of Example 1.

Example 2

An adhesive article of Example 2 was obtained in the same manner as in Example 1 except that a multifilament yarn (280 dtex) obtained by bundling 48 polyester yarns (filaments) without twisting was used as a core material.

Example 3

An adhesive article of Example 3 was obtained in the same manner as in Example 1 except that a multifilament yarn (250 dtex) obtained by bundling 72 polyester yarns (filaments) without twisting was used as a core material.

Example 4

An adhesive article of Example 4 was obtained in the same manner as in Example 1 except that a multifilament yarn (280 dtex) obtained by twisting 48 polyester yarns (filaments) at 50 times/m was used as a core material.

Example 5

An adhesive article of Example 5 was obtained in the same manner as in Example 4 except that the twist number was set to 150 times/m.

Example 6

An adhesive article of Example 6 was obtained in the same manner as in Example 4 except that the twist number was set to 300 times/m.

Example 7

An adhesive article of Example 7 was obtained in the same manner as in Example 4 except that the twist number was set to 1,000 times/m.

Example 8

An adhesive article of Example 8 was obtained in the same manner as in Example 1 except that a multifilament yarn (110 dtex) obtained by bundling 24 hollow yarns without twisting was used as a core material.

Example 9

An adhesive article of Example 9 was obtained in the same manner as in Example 1 except that two core materials used in Example 2 were bundled without twisting and used as a core material.

Example 10

An adhesive article of Example 10 was obtained in the same manner as in Example 1 except that two core materials used in Example 2 were bundled with twisting at 150 times/m and used as a core material.

Example 11

An adhesive article of Example 11 was obtained in the same manner as in Example 1 except that three core materials used in Example 2 were bundled without twisting and used as a core material.

Example 12

An adhesive article of Example 12 was obtained in the same manner as in Example 1 except that the three core materials used in Example 2 were bundled with twisting at 150 times/m and used as a core material.

Example 13

An adhesive article of Example 13 was obtained in the same manner as in Example 1 except that a multifilament yarn (260 dtex) obtained by bundling four polyester yarns (filaments) without twisting was used as a core material.

Example 14

An adhesive article of Example 14 was obtained in the same manner as in Example 1 except that the twist number was set to 120 times/m.

Example 15

An adhesive article of Example 15 was obtained in the same manner as in Example 4 except that the twist number was set to 5 times/m.

Comparative Example 1

An adhesive article of Comparative Example 1 was obtained in the same manner as in Example 1 except that one 280 dtex polyester yarn (filament) was used as a core material.

Comparative Example 2

An adhesive article of Comparative Example 2 was obtained in the same manner as in Example 1 except that a multifilament yarn (315 dtex) obtained by bundling three polyester yarns (filaments) without twisting was used as a core material.

[Evaluation of Adhesive Article]

The adhesive force of the obtained adhesive article of each of the examples was evaluated by the following method.

<Evaluation of Adhesive Force>

Using the adhesive article of each of the examples, a circular acrylic plate 42 having a thickness of 3 mm and a diameter of 70 mm and a rectangular polycarbonate resin plate 41 (a short side of 80 mm, a long side of 110 mm, a thickness of 10 mm) having a rectangular slit in the center (a short side of 30 mm, a long side of 40 mm) were allowed to bond to each other such that the center of the acrylic plate 42 coincides with the center of the slit of the polycarbonate resin plate 41, and then were allowed to press-bond at 2 kg for 10 seconds. As shown in (a) and (b) of FIG. 3, the adhesive articles were disposed along the edge of the acrylic plate. A perspective view of the bonding state is shown in (a) of FIG. 3, and a cross-sectional view taken along the line A-A in (a) of FIG. 3 is shown in (b) of FIG. 3.

Next, the polycarbonate resin plate 41 was fixed, and as shown in (b) of FIG. 3, a load was applied to the center of the acrylic plate 42 through the slit in a direction in which the acrylic plate 42 and the polycarbonate resin plate 41 were separated from each other, and a maximum load observed until the acrylic plate 42 and the polycarbonate resin plate 41 were separated was measured. The measurement results are shown in Table 1.

[Evaluation of Flexibility]

The flexibility of each of the adhesive bodies of Examples and Comparative Examples was evaluated by the following tests. The adhesive bodies having excellent flexibility is preferred from the viewpoint that the above-mentioned deformation like the crush of the core material easily occurs and the adhesive force is excellent, and from the viewpoint that the adhesive body easily deforms according to the adherend surface having a complicated shape such as a curved line, a curved surface, and unevenness.

First, a ring having a diameter of 5 cm was formed with the adhesive body of each of the examples. Next, the obtained ring was pressed from the outside toward the inside with a finger to be deformed, and the flexibility was evaluated in three stages as follows, based on the feeling at that time.

A (Flexible): Could deform with almost no resistance.

B (Slightly flexible): Felt some resistance when deforming.

C (hard): Felt a great resistance when deforming.

TABLE 1

| No. | Material of Filament | Number | Twist Number [times/m] | Fineness [dtex] | Twist Coefficient | Evaluation Adhesive Force [N/22 cm] | Flexibility |
|-----|----------------------|--------|------------------------|-----------------|-------------------|-------------------------------------|-------------|
| Example 1 | Polyester | 12 | 0 | 267 | 0 | 11 | A |
| Example 2 | | 48 | 0 | 280 | 0 | 19 | A |
| Example 3 | | 72 | 0 | 250 | 0 | 17 | A |
| Example 4 | | 48 | 50 | 280 | 8 | 21 | A |
| Example 5 | | 48 | 150 | 280 | 25 | 28 | A |
| Example 6 | | 48 | 300 | 280 | 50 | 13 | B |
| Example 7 | | 48 | 1000 | 280 | 167 | 13 | B |
| Example 8 | Hollow Yarn | 24 | 0 | 110 | 0 | 48 | A |
| Example 9 | Polyester | 96 | 0 | 560 | 0 | 25 | B |
| Example 10 | | 96 | 150 | 560 | 35 | 32 | B |
| Example 11 | | 144 | 0 | 840 | 0 | 23 | B |
| Example 12 | | 144 | 150 | 840 | 43 | 31 | B |
| Example 13 | | 4 | 0 | 260 | 0 | 12 | B |
| Example 14 | | 12 | 120 | 267 | 20 | 19 | A |
| Example 15 | | 48 | 5 | 280 | 1 | 20 | A |
| Comparative Example 1 | Polyester | 1 | 0 | 280 | 0 | 4 | C |
| Comparative Example 2 | | 3 | 0 | 315 | 0 | 6 | B |

The adhesive articles of Comparative Examples 1 and 2 had a few filaments constituting the core material and exhibited poor adhesive force.

On the other hand, the adhesive articles of Examples 1 to 15 having four or more filaments exhibited excellent adhesive force.

[Preparation of Adhesive Articles]

Examples 16 to 19

The adhesive article of each of Examples 16 to 19 was obtained in the same manner as in Example 1 except that six polyester yarns (filaments) were bundled without twisting to be a multifilament yarn (44 dtex) and the multifilament yarn was used as a core material in Example 16, that six polyester yarns (filaments) were bundled with twisting at the twist numbers shown in Table 2 to be a multifilament yarn (44 dtex) and the multifilament yarn was used as a core material in Examples 17 to 19, and that in Examples 16 to 19, the adhesion amount of the adhesive was changed as described in Table 2.

Examples 20 to 25

The adhesive article of each of the Examples 20 to 25 was obtained in the same manner as in Example 1, except that eight core materials in Example 2 were bundled without twisting to be a multifilament yarn (2240 dtex) and the multifilament yarn was used as a core material in Example 20, that eight core materials in Example 2 were bundled with twisting at the twist numbers shown in Table 2 to be a multifilament yarn (2240 dtex) and the multifilament yarn was used as a core material in Examples 21 to 25, and that the adhesion amount of the adhesive in Examples 20 to 25 was changed as shown in Table 2.

[Evaluation of Adhesive Article]

The adhesive force of each of the adhesive articles in Examples 16 to 25 were evaluated by the same method as described above. The results are shown in Table 2 together with the results of Examples 2, 4 to 7, and 15.

In Examples 4, 5, 15, 17, 18, 21 to 23, the adhesive force was particularly excellent as compared with other Examples having the same fineness. It is considered that this is because the core material in Examples 4, 5, 15, 17, 18, 21 to 23 particularly has the suitable twist coefficient.

Although the preferred embodiments of the present invention have been described above, the present invention is not limited to the above-described embodiment, and various modifications and substitutions can be added to the above-described embodiment without departing from the scope of the present invention.

REFERENCE SIGN LIST

1 Adherend
10, 30, 40 Adhesive article
11 Core material
12 Adhesive layer
13 Filament
41 Polycarbonate resin plate
42 Acrylic plate

The invention claimed is:

1. An adhesive article, comprising:

a core material; and an adhesive layer covering a longitudinal surface of the core material, wherein the adhesive layer comprises an acrylic adhesive, wherein the core material is a multifilament yarn including 48 to 384 filaments, the filaments comprise a polyester material, the adhesive layer is present on the longitudinal surface of the core material in an amount of 65 mg/m to 130 mg/m, the core material has a twist coefficient K represented by a formula (A), $$K = T/\sqrt{10000/D} \tag{A}$$

in the formula (A), K is a twist coefficient, T is a twist number (unit: [times/m]), and D is a fineness (unit: [dtex]),

TABLE 2

| No. | Core Material | | | | | | Adhesive | | Evaluation |
|---|---|---|---|---|---|---|---|---|---|
| | Material of Filament | Number | Fineness [dtex] | Theoretical Diameter [μm] | Twist Number (Times/m) | Twist Coefficient | Adhesion Amount [mg/m] | Theoretical Thickness [μm] | Adhesive Force [N/22 cm] |
| Example 16 | Polyester | 6 | 44 | 60 | 0 | 0 | 15 | 40 | 14 |
| Example 17 | | | | | 150 | 10 | 15 | 40 | 16 |
| Example 18 | | | | | 600 | 40 | 15 | 40 | 20 |
| Example 19 | | | | | 1000 | 66 | 15 | 40 | 12 |
| Example 2 | | 48 | 280 | 160 | 0 | 0 | 65 | 90 | 19 |
| Example 15 | | | | | 5 | 1 | 65 | 90 | 20 |
| Example 4 | | | | | 50 | 8 | 65 | 90 | 21 |
| Example 5 | | | | | 150 | 25 | 65 | 90 | 28 |
| Example 6 | | | | | 300 | 50 | 65 | 90 | 13 |
| Example 7 | | | | | 1000 | 167 | 65 | 90 | 13 |
| Example 20 | | 384 | 2240 | 430 | 0 | 0 | 130 | 80 | 11 |
| Example 21 | | | | | 20 | 9 | 130 | 80 | 33 |
| Example 22 | | | | | 50 | 24 | 130 | 80 | 39 |
| Example 23 | | | | | 75 | 35 | 130 | 80 | 35 |
| Example 24 | | | | | 150 | 71 | 130 | 80 | 30 |
| Example 25 | | | | | 350 | 166 | 130 | 80 | 28 | the core material has a twist number of 50 to 150 times/m, and the twist coefficient K represented by the formula (A) of the core material is 24 to less than 50.

2. The adhesive article according to claim 1, wherein the filaments comprise at least one hollow yarn.

3. The adhesive article according to claim 1, wherein the core material has a fineness of 280 to 2240 dtex.

* * * * *